United States Patent
Tomita

(10) Patent No.: US 7,861,089 B2
(45) Date of Patent: Dec. 28, 2010

(54) COMMUNICATION DEVICE, COMMUNICATION METHOD, PROGRAM, AND RECORDING MEDIUM

(75) Inventor: Nobuyoshi Tomita, Kanagawa (JP)

(73) Assignee: Sony Corporation (JP)

( * ) Notice: Subject to any disclaimer, the term of this patent is extended or adjusted under 35 U.S.C. 154(b) by 1022 days.

(21) Appl. No.: 11/652,390

(22) Filed: Jan. 11, 2007

(65) Prior Publication Data

US 2007/0198286 A1 Aug. 23, 2007

(51) Int. Cl.
*G06F 21/00* (2006.01)

(52) U.S. Cl. ...................... 713/182; 380/287

(58) Field of Classification Search ............. 713/185, 713/186, 168, 182; 348/169; 379/433; 705/16; 726/21; 380/287

See application file for complete search history.

(56) References Cited

U.S. PATENT DOCUMENTS

| | | | |
|---|---|---|---|
| 7,574,608 B2 * | 8/2009 | Rodriguez et al. | 713/182 |
| 7,603,702 B2 * | 10/2009 | Crane | 726/21 |
| 2003/0037243 A1 * | 2/2003 | Gruteser et al. | 713/185 |
| 2005/0229008 A1 * | 10/2005 | Crane | 713/186 |
| 2006/0012681 A1 * | 1/2006 | Fujii | 348/169 |
| 2006/0036855 A1 * | 2/2006 | Simonen | 713/168 |
| 2006/0256959 A1 * | 11/2006 | Hymes | 379/433.04 |
| 2008/0162291 A1 * | 7/2008 | Schuler et al. | 705/16 |

FOREIGN PATENT DOCUMENTS

EP 1 351 113 10/2003

OTHER PUBLICATIONS

Analysis and Synthesis of facial Image Sequesnces using physical and anatomical Models; Demetri Terzopoulos; Year: 1993; IEEE; pp. 1-11.*

* cited by examiner

*Primary Examiner*—Kambiz Zand
*Assistant Examiner*—Monjour Rahim
(74) *Attorney, Agent, or Firm*—Lerner, David, Littenberg, Krumholz & Mentlik, LLP

(57) ABSTRACT

A communication device, operable to communicate with an electronic device via a network, may include a storage section, an image capturing section, and an identification section. The storage section may store device identification information identifying the electronic device and one or more face images of one or more users that use the electronic device while associating the device identification information with each of the face images of the users of the electronic device. The image capturing section may capture an image of a face of the user of the electronic device. The identification section may identify the electronic device on the basis of the device identification information stored in association with one of the stored face images that matches the captured image of the face of the user of the electronic device.

16 Claims, 9 Drawing Sheets

| USER ID | FACE IMAGE OF USER | DEVICE ID |
|---|---|---|
| TARO [taro@aaaa.jp] |  | TARO'S DIGITAL CAMERA [00:01:02:03:04:05] |
| HANAKO [hanako@bbbb.jp] |  | TARO'S DIGITAL CAMERA [00:01:02:03:04:05] |
| TARO [taro@aaaa.jp] |  | DIGITAL CAMERA OF MORIMURA FAMILY [00:01:02:06:07:08] |

COMMUNICATION DEVICE, COMMUNICATION METHOD, PROGRAM, AND RECORDING MEDIUM

CROSS-REFERENCE TO RELATED APPLICATIONS

This application claims priority from Japanese Patent Application No. JP 2006-006308 filed in the Japanese Patent Office on Jan. 13, 2006, the entire content of which is incorporated herein by reference.

BACKGROUND OF THE INVENTION

1. Field of the Invention

The present invention relates to communication devices, communication methods, programs, and recording media. More particularly, the present invention relates to a communication device and a communication method capable of authenticating target devices and users connected to the communication device via a network, a program, and a recording medium.

2. Description of the Related Art

Recently, an application of mobile devices, such as digital still cameras, camcorders, mobile phones, for image data exchange has been suggested. More specifically, mobile devices constitute an ad-hoc network using a wireless local area network (LAN) compliant with a standard, such as IEEE (institute of electrical and electronics engineers) 802.11a, IEEE 802.11b, or IEEE 802.11g, and Bluetooth, and image data stored in a mobile device is disclosed to target users, whereby the image data can be exchanged.

In such a case, a function for controlling disclosure permission set for files or folders for each target user who receives the disclosure is desired. Accordingly, it is necessary to perform data access control for each target user who receives the disclosure.

Such data access control methods include a method for performing access control on a device-by-device basis. In this method, IDs (Identifications) of target devices are preregistered in a mobile device, and device authentication is performed when the device is connected to a wireless LAN after a user of the device selects the target device from a registration list.

In addition, it is necessary to authenticate each of target users when performing the access control on a user-by-user basis. Technologies for personal identification includes biometrics authentication in which authentication is performed using, for example, fingerprints and vein patterns. Biometrics is used when the device authenticates an owner thereof.

A method in which a face image of an owner of a device is preregistered in the device, and a face image of a user is captured before an operation, and comparison of the captured face image and the registered face image is performed so as to put the device into a usable state is used in a technology for performing authentication using face images.

Furthermore, there is also a method in which authentication can be performed by comparing a preregistered face image and a face image captured at that time to determine whether a user logging in a system is a registered person (see, for example, Japanese Unexamined Patent Application Publication No. 2004-005345).

However, when a plurality of users share one device connectable to a wireless LAN (e.g., when a plurality of family members share one device) or when one user temporarily borrows and uses a device belonging to another user, it may be impossible to perform access control for each user using the device.

Embodiments of the present invention are made in view of such circumstances, and allow access control to be performed for each user using a target device or a source device.

SUMMARY OF THE INVENTION

A communication device, according to an embodiment of the present invention, which communicates with an electronic device via a network, may include storage means storing device identification information identifying the electronic device and one or more face images of one or more users that use the electronic device while associating the device identification information with each of the face images of the users of the electronic device, image capturing means capturing an image of a face of the user of the electronic device, and identification means identifying the electronic device on the basis of the device identification information stored in association with one of the stored face images that matches the captured image of the face of the user of the electronic device.

The storage means may store user identification information identifying each of the users in association with the corresponding face images of the users. The identification means may identify the user on the basis of the user identification information stored in association with one of the stored face images that matches the captured image of the face of the user.

The storage means may store encryption method information, indicating an encryption method, and an encryption key in association with each of the face images of the users. The device may further include authentication means authenticating the electronic device using the encryption method information and the encryption key stored in association with one of the stored face images that matches the captured image of the face of the user.

The storage means may store range information indicating a range of data permitted to be provided to the electronic device used by the user in association with each of the face images of the users. The device may further include read controlling means controlling reading of data recorded on a recording medium according to the range information stored in association with one of the stored face images that matches the captured image of the face of the user.

The storage means may store operation information indicating an operation to be executed in response to a request from the electronic device used by the user in association with each of the face images. The device may further include operation executing means executing the operation according to the operation information stored in association with one of the stored face images that matches the captured image of the face of the user.

The device may further include display controlling means controlling displaying of a list of the stored face images, and input means receiving an instruction, for selecting one of the displayed face images, corresponding to a user operation performed on the displayed list of the face images. The identification means may identify the electronic device on the basis of the device identification information stored in association with the selected face image.

The device may further include recognizing means recognizing a face image obtained by capturing the image of the face of the user of the electronic device, determining means determining whether or not the face image resulting from the capturing matches one of the stored face images, display controlling means controlling displaying of a list of the stored face images to be determined to match the face image resulting from the capturing and the associated device identification information, and input means receiving an instruction, for selecting one of the displayed face images and the device identifying information, corresponding to a user operation performed on the displayed list of the face images and the device identifying information. The identification means may identify the electronic device on the basis of the selected device identification information.

A communication method according to an embodiment of the present invention for enabling communication with an electronic device via a network may include the steps of storing device identification information identifying the electronic device and one or more face images of one or more users that use the electronic device while associating the device identification information with each of the face images of the users of the electronic device, capturing an image of a face of the user of the electronic device, and identifying the electronic device on the basis of the device identification information stored in association with one of the stored face images that matches the captured image of the face of the user of the electronic device.

A program according to an embodiment of the present invention and a program recorded on a recording medium according to an embodiment of the present invention cause a computer to execute a process for controlling a communication device that communicates with an electronic device via a network. The process may include the steps of controlling storing of device identification information identifying the electronic device and one or more face images of one or more users that use the electronic device so that the device identification information is associated with each of the face images of the users of the electronic device, controlling capturing of an image of a face of the user of the electronic device, and identifying the electronic device on the basis of the device identification information stored in association with one of the stored face images that matches the captured image of the face of the user of the electronic device.

A communication device, according to another embodiment of the present invention, which communicates with an electronic device via a network, may include storage means storing device identification information identifying the electronic device, one or more face images of one or more users that use the electronic device, and user identification information identifying each of the users while associating the device identification information, each of the face images, and the user identification information with each other, image capturing means capturing an image of a face of the user of the electronic device, determining means determining whether or not the captured face image of the user of the electronic device matches one of the stored face images, and identification means specifying the device identification information and the user identification information stored in association with the matching face image when the captured face image of the user and one of the stored face images are determined to match.

A communication method, according to another embodiment of the present invention, enabling communication with an electronic device via a network, may include the steps of storing device identification information identifying the electronic device, one or more face images of one or more users that use the electronic device, and user identification information identifying each of the users while associating the device identification information, each of the face images, and the user identification information with each other, capturing an image of a face of the user of the electronic device, determining whether or not the captured face image of the user of the electronic device matches one of the stored face images, and specifying the device identification information and the user identification information stored in association with the matching face image when the captured face image of the user and one of the stored face images are determined to match.

A program according to another embodiment of the present invention and a program recorded on a recording medium according to another embodiment of the present invention cause a computer to execute a process for controlling a communication device that communicates with an electronic device via a network. The process may include the steps of controlling storing of device identification information identifying the electronic device, one or more face images of one or more users that use the electronic device, and user identification information identifying each of the users while so that the device identification information, each of the face images, and the user identification information are associated with each other, controlling capturing of an image of a face of the user of the electronic device, determining whether or not the captured face image of the user of the electronic device matches one of the stored face images, and specifying the device identification information and the user identification information stored in association with the matching face image when the captured face image of the user and one of the stored face images are determined to match.

In the embodiments of the present invention, the device identification information identifying the electronic device and the face images of the users that use the electronic device are stored with being associated with each other. The image of the face of the user of the electronic device is captured, and the electronic device is identified on the basis of the device identification information stored in association with one of the stored face images that matches the captured image of the face of the user of the electronic device.

In the embodiments of the present invention, the device identification information identifying the electronic device, the face images of the users that use the electronic device, and the user identification information identifying each of the users are stored with being associated with each other. The image of the face of the user of the electronic device is captured, and whether or not the captured face image of the user matches one of the stored face images is determined. If the captured face image of the user is determined to match one of the stored face images, the device identification information and the user identification information stored in association with the matching face image are specified.

As described above, according to the embodiment of the present invention, the communication device can communicate with a target device via a network. In addition, according to the embodiment of the present invention, it is possible to perform access control on a device-by-device basis.

According to another embodiment of the present invention, the communication device can communicate with a target device via a network. In addition, according to the embodiment of the present invention, it is possible to perform access control for each target device and for each user using the target device.

DETAILED DESCRIPTION

Figure 1:
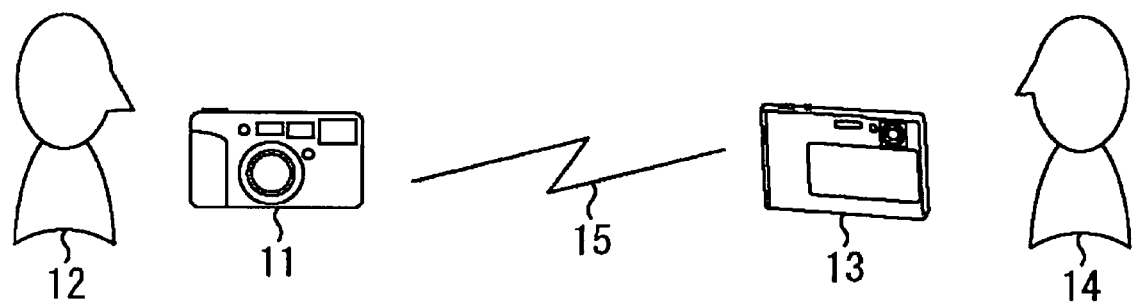
FIG. 1 is a diagram illustrating an example of communication devices according to an embodiment of the present invention.

Before describing embodiments of the present invention, the correspondence between the features of the present invention and the specific elements disclosed in an embodiment of the present invention in the specification or the drawings is discussed below. This description is intended to assure that embodiments supporting the claimed invention are described in this specification or the drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

A communication device, according to an embodiment of the present invention, which communicates with an electronic device via a network, includes storage means (for example, a storage section shown in FIG. 2) storing device identification information identifying the electronic device and one or more face images of one or more users that use the electronic device while associating the device identification information with each of the face images of the users of the electronic device, image capturing means (for example, an image capturing section 31 shown in FIG. 2) capturing an image of a face of the user of the electronic device, and identification means (for example, an identification unit 75 shown in FIG. 2) identifying the electronic device on the basis of the device identification information stored in association with one of the stored face images that matches the captured image of the face of the user of the electronic device.

The storage means may store user identification information identifying each of the users in association with the corresponding face images of the users. The identification means may identify the user on the basis of the user identification information stored in association with one of the stored face images that matches the captured image of the face of the user (for example, STEP S34 shown in FIG. 7).

The storage means may store encryption method information, indicating an encryption method, and an encryption key in association with each of the face images of the users. The device may further include authentication means (for example, an authentication processing unit 76 shown in FIG. 2) authenticating the electronic device using the encryption method information and the encryption key stored in association with one of the stored face images that matches the captured image of the face of the user.

The storage means may store range information indicating a range of data permitted to be provided to the electronic device used by the user in association with each of the face images of the users. The device may further include read controlling means (for example, a read controlling unit 79 shown in FIG. 2) controlling reading of data recorded on a recording medium according to the range information stored in association with one of the stored face images that matches the captured image of the face of the user.

The storage means may store operation information indicating an operation to be executed in response to a request from the electronic device used by the user in association with each of the face images. The device may further include operation executing means (for example, a read controlling unit 79 shown in FIG. 2) executing the operation according to the operation information stored in association with one of the stored face images that matches the captured image of the face of the user.

The device may further include display controlling means (for example, a display controlling unit 73 shown in FIG. 2) controlling displaying of a list of the stored face images, and input means (for example, an input section 33 shown in FIG. 2) receiving an instruction, for selecting one of the displayed face images, corresponding to a user operation performed on the displayed list of the face images. The identification means may identify the electronic device on the basis of the device identification information stored in association with the selected face image (for example, STEP S34 shown in FIG. 7).

The device may further include recognizing means (for example, a face image recognizer 91 shown in FIG. 2) recognizing a face image obtained by capturing the image of the face of the user of the electronic device, determining means (for example, a face image determiner 92 shown in FIG. 2) determining whether or not the face image resulting from the capturing matches one of the stored face images, display controlling means (for example, a display controlling unit 73 shown in FIG. 2) controlling displaying of a list of the stored face images to be determined to match the face image resulting from the capturing and the associated device identification information, and input means (for example, an input section 33 shown in FIG. 2) receiving an instruction, for selecting one of the displayed face images and the device identifying information, corresponding to a user operation performed on the displayed list of the face images and the device identifying information. The identification means may identify the electronic device on the basis of the selected device identification information (for example, STEP S61 shown in FIG. 9).

Figure 9:
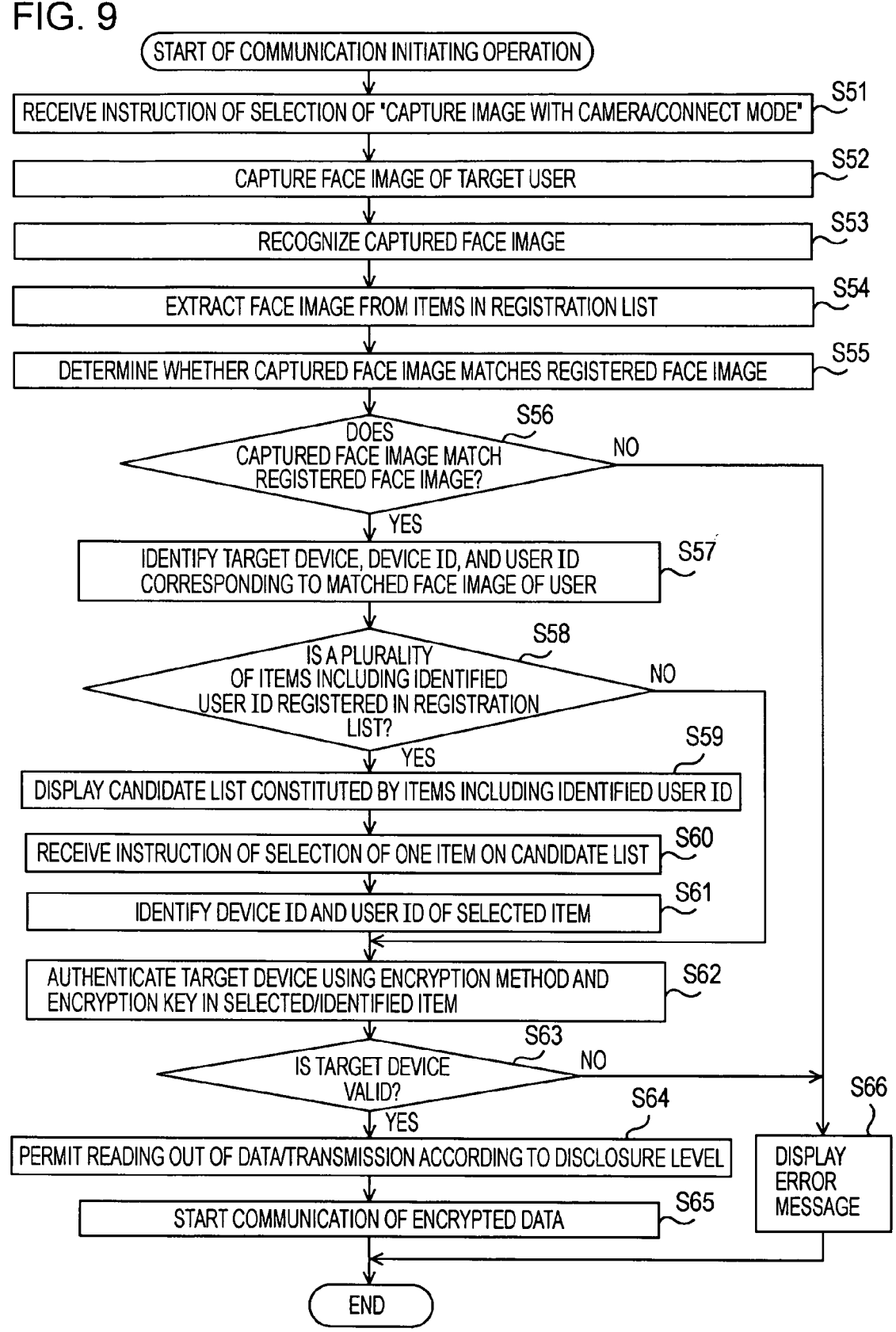
FIG. 9 is a flowchart illustrating another example of a communication initiating operation.

A communication method according to an embodiment of the present invention for enabling communication with an electronic device via a network includes the steps of storing device identification information identifying the electronic device and one or more face images of one or more users that use the electronic device while associating the device identification information with each of the face images of the users of the electronic device (for example, STEP S15 shown in FIG. 4), capturing an image of a face of the user of the electronic device (for example, STEP S52 shown in FIG. 9), and identifying the electronic device on the basis of the device identification information stored in association with one of the stored face images that matches the captured image of the face of the user of the electronic device (for example, STEP S57 shown in FIG. 9).

A program according to an embodiment of the present invention and a program recorded on a recording medium according to an embodiment of the present invention cause a computer to execute a process for controlling a communication device that communicates with an electronic device via a network. The process includes the steps of controlling storing of device identification information identifying the electronic device and one or more face images of one or more users that use the electronic device so that the device identification information is associated with each of the face images of the users of the electronic device (for example, STEP S15 shown in FIG. 4), controlling capturing of an image of a face of the user of the electronic device (for example, STEP S52 shown in FIG. 9), and identifying the electronic device on the basis of the device identification information stored in association with one of the stored face images that matches the captured image of the face of the user of the electronic device (for example, STEP S57 shown in FIG. 9).

A communication device, according to another embodiment of the present invention, which communicates with an electronic device via a network, includes storage means (for example, a storage section 32 shown in FIG. 2) storing device identification information identifying the electronic device, one or more face images of one or more users that use the electronic device, and user identification information identifying each of the users while associating the device identification information, each of the face images, and the user identification information with each other, image capturing means (for example, an image capturing section 31 shown in FIG. 2) capturing an image of a face of the user of the electronic device, determining means (for example, a face image determiner 92 shown in FIG. 2) determining whether or not the captured face image of the user of the electronic device matches one of the stored face images, and identification means (for example, an ID specifier 93 shown in FIG. 2) specifying the device identification information and the user identification information stored in association with the matching face image when the captured face image of the user and one of the stored face images are determined to match.

A communication method, according to another embodiment of the present invention, enabling communication with an electronic device via a network, includes the steps of storing device identification information identifying the electronic device, one or more face images of one or more users that use the electronic device, and user identification information identifying each of the users while associating the device identification information, each of the face images, and the user identification information with each other (for example, STEP S15 shown in FIG. 4), capturing an image of a face of the user of the electronic device (for example, STEP S52 shown in FIG. 9), determining whether or not the captured face image of the user of the electronic device matches one of the stored face images (for example, STEP S55 shown in FIG. 9), and specifying the device identification information and the user identification information stored in association with the matching face image when the captured face image of the user and one of the stored face images are determined to match (for example, STEP S57 shown in FIG. 9).

A program according to another embodiment of the present invention and a program recorded on a recording medium according to another embodiment of the present invention cause a computer to execute a process for controlling a communication device that communicates with an electronic device via a network. The process includes the steps of controlling storing of device identification information identifying the electronic device, one or more face images of one or more users that use the electronic device, and user identification information identifying each of the users while so that the device identification information, each of the face images, and the user identification information are associated with each other (for example, STEP S15 shown in FIG. 4), controlling capturing of an image of a face of the user of the electronic device (for example, STEP S52 shown in FIG. 9), determining whether or not the captured face image of the user of the electronic device matches one of the stored face images (for example, STEP S55 shown in FIG. 9), and specifying the device identification information and the user identification information stored in association with the matching face image when the captured face image of the user and one of the stored face images are determined to match (for example, STEP S57 shown in FIG. 9).

FIG. 1 is a diagram illustrating an example of communication devices according to an embodiment of the present invention. A communication device 11 may be a device such as a digital still camera or a digital video camera, and is used by a user 12. Similarly, a communication device 13 may be a device such as a digital still camera or a digital video camera, and is used by a user 14.

The communication devices 11 and 13 are connected to each other via a network 15. Various data is transmitted via a wireless or wired transmission medium of the network 15. The network 15 may be a wireless LAN compliant with a standard, for example, IEEE 802.11a, IEEE 802.11b, or IEEE 802.11g or may be constituted by transmission paths compliant with the Bluetooth standard. More specifically, for example, the network 15 may be an ad-hoc network using the wireless LAN.

The communication device 11 identifies the communication device 13, which is an example of an electronic device. Alternatively, the communication device 11 identifies the communication device 13 and the user 14.

For example, the communication device 11 operated by the user 12 authenticates the communication device 13, i.e., an example of an electronic device. If the communication device 11 authenticates the communication device 13 as being valid, the communication device 11 permits providing of a predetermined range of data among data (e.g., image data of still images and movies) stored in the communication device 11 to the communication device 13.

Figure 2:
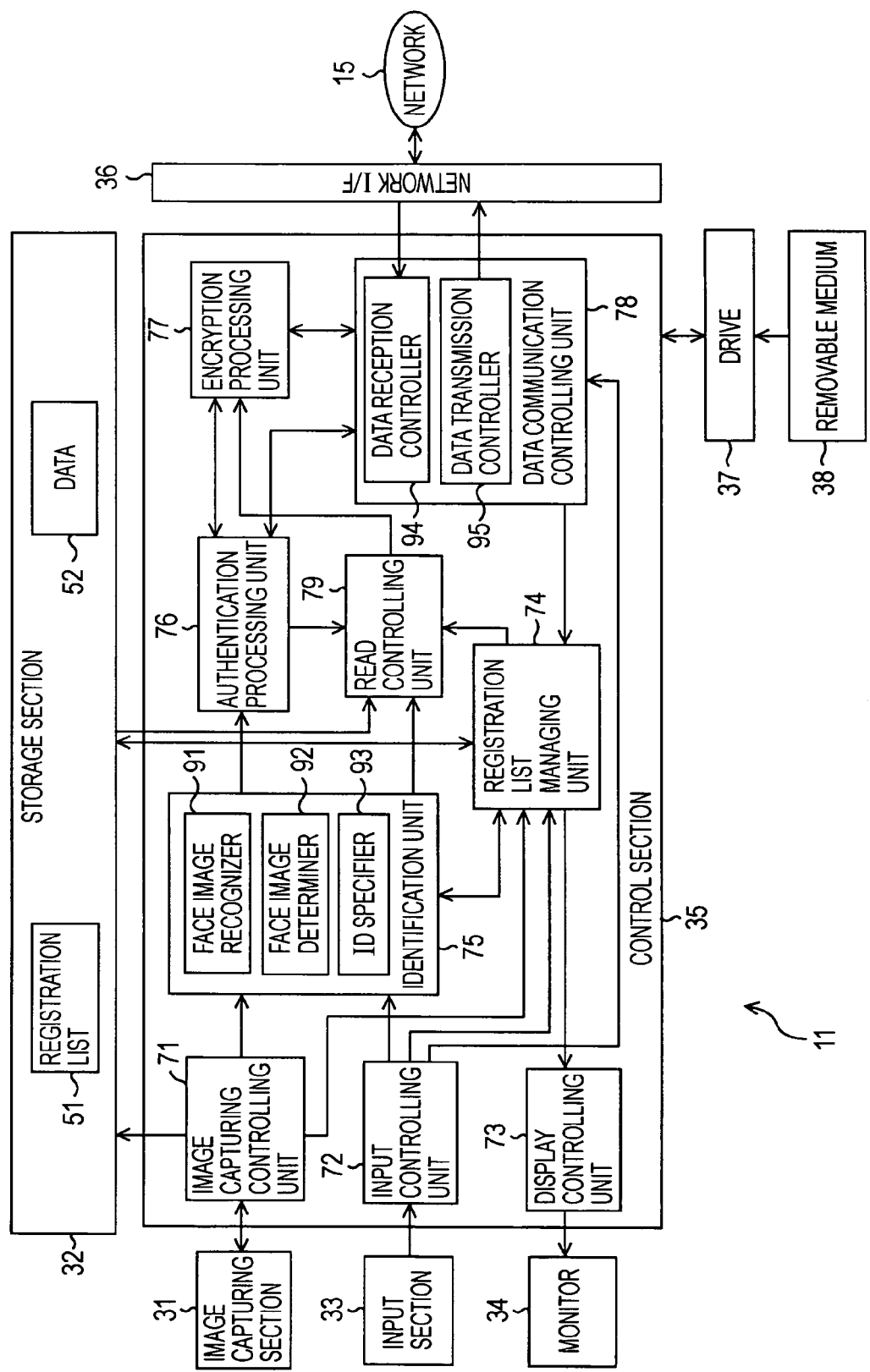
FIG. 2 is a block diagram illustrating an example of a configuration of a communication device.

FIG. 2 is a block diagram illustrating an example of a configuration of the communication device 11.

The communication device 11 includes an image capturing section 31, a storage section 32, an input section 33, a monitor 34, a control section 35, a network interface (hereinafter, referred to as a network I/F) 36, and a drive 37. A removable medium 38 is inserted into the communication device 11, if necessary.

The image capturing section 31 includes photoelectric transducers, such as CCD (charge coupled device) or CMOS (complementary metal-oxide semiconductor) sensors, and an optical system. The photoelectric transducers convert an optical image into electric signals. The optical system forms the optical image of a subject on the photoelectric transducers. The image capturing section 31 converts the image of the subject into image signals, i.e., the electric signals, under the control of the control section 35. That is, the image capturing section 31 captures an image of the subject under the control of the control section 35. For example, the image capturing section 31 captures an image of the face of the user 14, i.e., the subject.

The image capturing section 31 supplies the image signals resulting from the image capturing to the control section 35.

The storage section 32 includes a hard disk drive, a set of an optical disc, such as a DVD (digital versatile disc) driven by a predetermined drive, and a drive, or a semiconductor memory such as a memory card.

The storage section 32 stores device identification information identifying electronic devices such as the communication device 13 and face images (e.g., user's face images described below) of users, such as the user 14, that use the electronic devices while associating the device identification information with the face images.

For example, the storage section 32 may store a user ID, i.e., user identification information identifying the user 14, in association with the face image.

That is, the storage section 32 may store the device identification information identifying the electronic devices such as the communication device 13, the face images of users, such as the user 14, that use the electronic devices, and the user identification information, such as user IDs, identifying the users while associating the device identification information, the face images, and the user identification information with each other.

Furthermore, the storage section 32 may store encryption method information indicating an encryption method and an encryption key in association with the face images of users, such as the user 14. In addition, the storage section 32 may also store range information indicating a range of data permitted to be provided to the electronic devices, such as the communication device 13, used by users, such as the user 14, in association with the face images. That is, the storage section 32 may store operation information indicating an operation to be executed in response to a request from the electronic device used by the user in association with the face image. For example, the storage section 32 stores a disclosure level (described below), i.e., the range information indicating the range of data permitted to be provided to the communication device 13 used by the user 14 in association with the face image of the user.

The storage section 32 stores a registration list 51 and data 52.

The registration list 51 is a prestored list, and includes information used for identification of the target communication device 13 and the user 14. More specifically, although detailed description will be given below, the registration list 51 includes a plurality of items, each of which is constituted by a user's face image, a user ID, a device ID, encryption method information and an encryption key, and a disclosure level, for example. The user's face image is a captured face image of the user 14. The user ID is information identifying the user 14. The device ID is information identifying the communication device 13. The encryption method information is information used for authentication of the communication device 13. The disclosure level is information indicating a range of data permitted to be provided to the communication device 13.

The data 52 includes still image data and movie data. For example, the data 52 includes image data of images captured by the image capturing section 31, image data for displayed images supplied from the control section 35, and data read out from the removable medium 38 under the control of the control section 35. Programs may be stored in the storage section 32 as the data 52.

The user 12 operates the input section 33 to input an instruction to the communication device 11. The input section 33 includes, for example, various operation buttons, a keyboard, a mouse, a remote control, a touch panel, and a microphone. The input section 33 receives operations performed by the user 12, and supplies signals (information) indicating the operations to the control section 35. Although detailed description will be given below, the input section 33 receives an instruction, for selecting one of displayed face images, corresponding to an operation performed on a displayed list of the face images by the user 12. In addition, the input section 33 receives an instruction, for selecting one of the displayed face images and device identification information, corresponding to an operation performed on the displayed list of the face images and the device identification information by the user 12.

The monitor 34 includes a display device such as an LCD (liquid crystal display) or an organic EL (electro luminescence). The monitor 34 displays various images under the control of the control section 35. For example, the monitor 34 displays images or the registration list 51 and a candidate list on the basis of display data, supplied from the control section 35, used for displaying the images or the registration list 51 and the candidate list. The candidate list will be described below.

The control section 35 includes, for example, a microprocessor, and controls entity of the communication device 11.

The network I/F 36 transmits and receives various data via the network 15.

The removable medium 38, such as a magnetic disc, an optical disc, a magneto-optical disc, or a semiconductor memory, is inserted into the drive 37, if necessary. The drive 37 installs or stores computer programs and data read out from the mounted removable medium 38 in the storage section 32 under the control of the control section 35, if necessary.

The control section 35 implements an image capturing controlling unit 71, an input controlling unit 72, a display controlling unit 73, a registration list managing unit 74, an identification unit 75, an authentication processing unit 76, an encryption processing unit 77, a data communication controlling unit 78, and a read controlling unit 79 by executing computer programs.

The image capturing controlling unit 71 controls the image capturing section 31 to control capturing of an image of a subject performed by the image capturing section 31. The image capturing controlling unit 71 generates image data from image signals supplied from the image capturing section 31, and supplies the generated image data to the storage section 32, the registration list managing unit 74, and the identification unit 75.

The input controlling unit 72 controls the input section 33, and acquires signals, indicating the instructions given by the user 12, corresponding to operations performed by the user 12, from the input section 33. For example, the input controlling unit 72 acquires a signal indicating information input with an operation performed by the user 12 and to be registered in the registration list 51, and supplies the information to be registered in the registration list 51 to the registration list managing unit 74.

In addition, for example, the input controlling unit 72 acquires information indicating an item, selected from the items included in the registration list 51 and the candidate list displayed on the monitor 34 with an operation performed by the user 12, from the input section 33. The input controlling unit 72 then supplies the information indicating the item selected by the user 12 to the identification unit 75.

The display controlling unit 73 controls displaying of images on the monitor 34. For example, the display controlling unit 73 controls displaying of a list of face images of users registered in the registration list 51, which is an example list of the stored face images, on the monitor 34. In addition, the display controlling unit 73 generates display data used for displaying the images on the basis of the image data supplied from the storage section 32, and supplies the generated display data to the monitor 34, thereby causing the monitor 34 to display the images thereon.

The display controlling unit 73 also controls displaying of a list of face images determined to match the captured face image and corresponding device identification information.

In addition, for example, the display controlling unit 73 generates the display data used for displaying the registration list 51 read out by the registration list managing unit 74 and the candidate list, and supplies the generated display data to the monitor 34, thereby causing the monitor 34 to display the registration list 51 and the candidate list thereon.

The registration list managing unit 74 registers items in the registration list 51, updates the registration list 51, and reads out the registration list 51 so as to manage the registration list 51. More specifically, for example, the registration list managing unit 74 registers (stores) various information in the registration list 51, and stores the registration list 51 in the storage section 32. The registration list managing unit 74 gathers the face image of the user 14 supplied from the image capturing controlling unit 71, the user ID identifying the user 14 supplied from the input controlling unit 72, the device ID identifying the communication device 13 supplied from the data communication controlling unit 78 in an item, and registers the item in the registration list 51. For example, the user's face image, the user ID, and the device ID are gathered in the same item, whereby the user's face image, the user ID, and the device ID are associated with each other.

In addition, the registration list managing unit 74 reads out the registration list 51 from the storage section 32. After reading out the registration list 51 from the storage section 32, the registration list managing unit 74 supplies the information, such as the user's face image, the user ID, or the device ID, contained in the item registered in the read out registration list 51 to the identification unit 75 or the read controlling unit 79.

Furthermore, the registration list managing unit 74 generates a candidate list constituted by items, extracted from the registration list 51 read out from the storage section 32, including the identified user ID on the basis of the identified user ID and device ID supplied from the identification unit 75.

The identification unit 75 identifies the communication device 13, i.e., an example of an electronic device, on the basis of the device ID, i.e., an example of the device identification information, stored in association with the user's face image matching the captured face image of the user. Alternatively, the identification unit 75 identifies the device ID, i.e., an example of the device identification information, and the user ID, i.e., an example of the user identification information, stored in association with the matching face image when the captured face image of the user and the stored face image of the user match.

The identification unit 75 identifies the user on the basis of the user ID stored in association with the user's face image that matches the captured face image of the user. That is, the identification unit 75 identifies the user on the basis of the user identification information stored in association with the face image that matches the captured face image of the user.

The identification unit 75 includes a face image recognizer 91, a face image determiner 92, and an ID specifier 93.

The face image recognizer 91 recognizes the face image resulting from the image capturing of the face of the user. The face image recognizer 91 identifies a part corresponding to the face from the image data resulting from the image capturing of the face of the user 14 supplied from the image capturing controlling unit 71, and recognizes the part as the face image.

The face image determiner 92 determines whether or not the captured face image matches the stored face image of the user. More specifically, the face image determiner 92 extracts the face images from the items registered in the registration list 51 read out by the registration list managing unit 74. The face image determiner 92 compares the captured face image recognized by the face image recognizer 91 with each of the face images contained in the read out items so as to determine whether or not the face images match.

In addition, when the captured face image recognized by the face image recognizer 91 matches the face image contained in the item registered in the registration list 51 read out by the registration list managing unit 74, the face image determiner 92 supplies the information identifying the item containing the face image determined to match the captured face image to the ID specifier 93.

When the captured face image of the user is determined to match the stored face image, the ID specifier 93 specifies the device identification information and the user identification information stored in association with the matching face image. More specifically, when the captured face image of the user is determined to match the stored face image of the user, the ID specifier 93 specifies the device ID and the user ID stored in association with the user's face image matching the captured face image.

The ID specifier 93 selects one item from the registration list 51 read out by the registration list managing unit 74 on the basis of the information indicating one item selected by the user supplied from the input controlling unit 72. The ID specifier 93 then specifies the user ID and the device ID contained in the selected item. The ID specifier 93 then supplies the specified user ID and device ID to the read controlling unit 79. The ID specifier 93 also supplies the encryption method information and the encryption key included in the item containing the specified user ID and device ID to the authentication processing unit 76.

In addition, the ID specifier 93 specifies an item from the registration list 51 read out by the registration list managing unit 74 on the basis of the information identifying the item supplied from the face image determiner 92. That is, the ID specifier 93 specifies an item containing the user's face image that matches the captured face image.

If a plurality of specified items are registered in the registration list 51, the ID specifier 93 specifies the user IDs and the device IDS contained in the plurality of specified items, and supplies the user IDs and the device IDs to the registration list managing unit 74. If only one specified item is registered in the registration list 51, the ID specifier 93 specifies the user ID and the device ID contained in the specified item, and supplies the user ID and the device ID to the read controlling unit 79. In addition, in this case, the ID specifier 93 also supplies the encryption method information and the encryption key included in the item containing the specified user ID and device ID to the authentication processing unit 76.

The authentication processing unit 76 authenticates electronic devices using the encryption method information and the encryption key stored in association with the face image that matches the captured face image of the user. More specifically, the authentication processing unit 76 communicates with the communication device 13 via the encryption processing unit 77, the data communication controlling unit 78, the network I/F 36, and the network 15, and authenticates the communication device 13 using the encryption method information and the encryption key supplied from the identification unit 75. The authentication processing unit 76 also supplies the result of the authentication to the read controlling unit 79.

The encryption processing unit 77 encrypts the data with the encryption key according to the encryption method on the basis of the encryption method information and the encryption key supplied from the authentication processing unit 76.

More specifically, the encryption processing unit 77 encrypts the data 52 supplied from the read controlling unit 79, and supplies the encrypted data to the data communication controlling unit 78.

The data communication controlling unit 78 controls the transmission or reception of various data performed by the network I/F 36 via the network 15.

The data communication controlling unit 78 includes a data reception controller 94 and a data transmission controller 95. The data reception controller 94 controls the reception operation performed by the network I/F 36. The data reception controller 94 supplies the device ID, which is information to be contained in an item, received by the network I/F 36 to the registration list managing unit 74. The data transmission controller 95 controls the transmission operation performed by the network I/F 36. The data transmission controller 95 further supplies the encrypted data supplied from the encryption processing unit 95 to the network I/F 36.

The read controlling unit 79 controls reading of data stored in the storage section 32, which is an example of a recording medium, according to the disclosure level, i.e., an example of the range information, stored in association with the face image that matches the captured face image of the user. That is, the read controlling unit 79 executes an operation according to the operation information stored in association with the face image that matches the captured face image of the user.

For example, the read controlling unit 79 permits reading out and transmission of the data on the basis of the authentication result supplied from the authentication processing unit 76. More specifically, the read controlling unit 79 reads out the disclosure level contained in the corresponding item registered in the registration list 51 read out by the registration list managing unit 74 on the basis of the user ID and the deice ID supplied from the identification unit 75. After reading out the data 52 from the storage section 32 according to the read out disclosure level, the read controlling unit 79 supplies the read out data 52 to the encryption processing unit 77.

For example, the disclosure level contained in the item is represented by a natural number. The data 52 is attached with the disclosure level represented by a natural number beforehand. The read controlling unit 79 reads out the data 52 attached with the disclosure level the same as or lower than that contained in the item from the storage section 32, and supplies the read out data to the encryption processing unit 77. The read controlling unit 79 does not read out the data 52 attached with the disclosure level higher than that contained in the item from the storage section 32.

The network I/F 36 receives the information to be contained in the item registered in the registration list 51 transmitted via the network 15 under the control of the data reception controller 94, and supplies the received information to the data reception controller 94.

In addition, the network I/F 36 transmits the encrypted data supplied from the data transmission controller 95 via the network 15 under the control of the data transmission controller 95.

Figure 3:
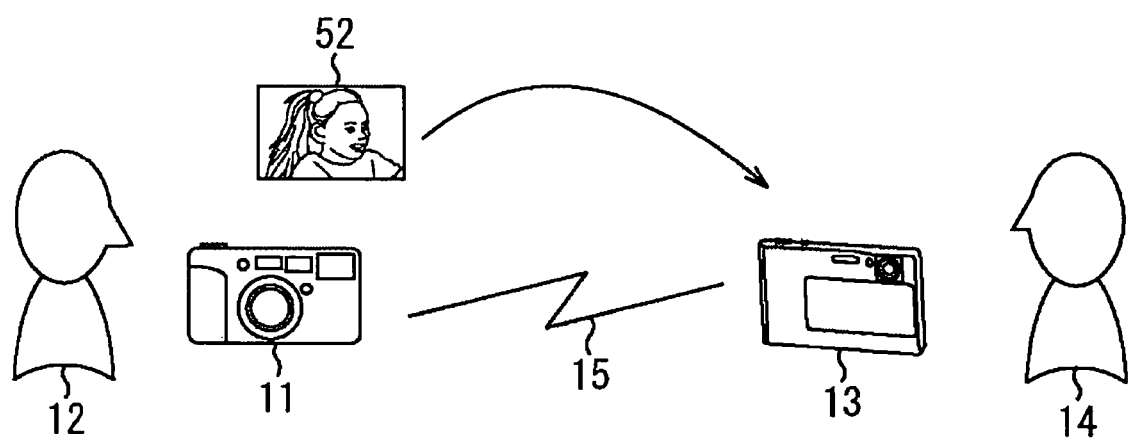
FIG. 3 is a diagram illustrating a procedure of providing data to an authenticated communication device.

FIG. 3 is a diagram illustrating a procedure of providing the data 52 stored in the communication device 11 to the authenticated communication device 13 shown in FIG. 1. Referring to FIG. 3, the communication device 11 operated by the user 12 authenticates the communication device 13, i.e., an example of an electronic device, and the user 14, i.e., the user of the communication device 13, on the basis of the registration list 51 prestored in the storage section 32 of the communication device 11. If the communication device 11 authenticates the communication device 13 as being valid, the communication device 11 permits reading out of the data 52 and transmission of the data 52 to the communication device 13 on the basis of the registration list 51.

Figure 4:
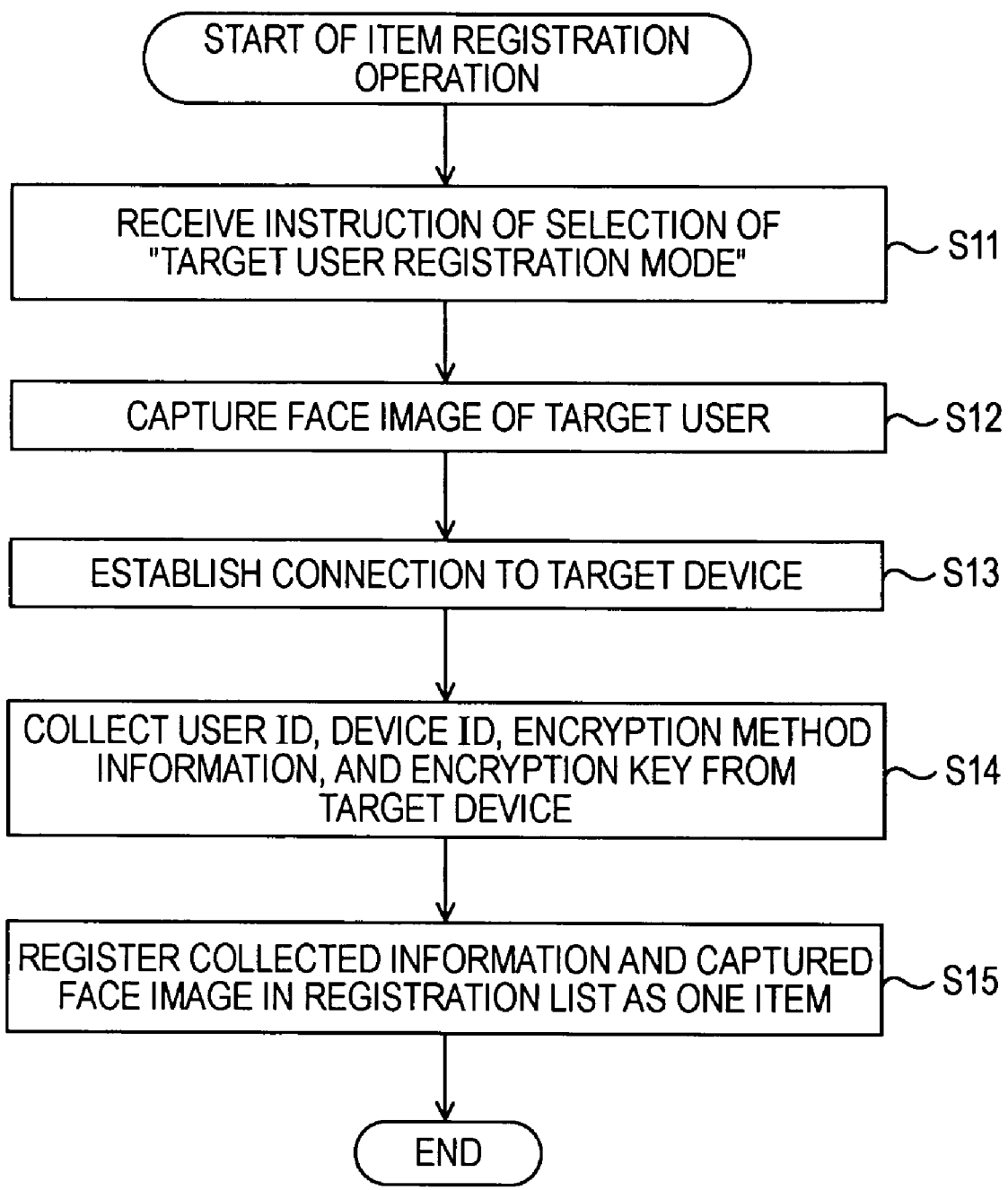
FIG. 4 is a flowchart illustrating an example of an operation of registering an item in a registration list.

Now, referring to a flowchart shown in FIG. 4, an operation for registering an item in the registration list 51 will be described. The registration list 51 is prestored in the communication device 11 shown in FIG. 3.

The communication device 11 starts the item registration operation, for example, upon the input controlling unit 72 receiving an instruction for selecting an operational mode after a user operates the input section 33.

An instruction for selecting a "target user registration mode" indicates an operation performed in order to set the operational mode to the "target user registration mode". At STEP S11, the input controlling unit 72 receives the instruction for selecting the "target user registration mode" supplied from the input section 33. The input control unit 72 instructs a mode setter (not shown) to switch the operational mode to the "target user registration mode". In response to the instruction given by the input controlling unit 72, the mode setter switches the operational mode to the "target user registration mode". For example, the mode setter sets a flag for the "target user registration mode" so as to switch the operational mode to the "target user registration mode".

At STEP S12, the image capturing section 31 captures a face image of the target user 14 under the control of the image capturing controlling unit 71. Face image data is data constituting the face image of the user 14. The image capturing controlling unit 71 generates the face image data from the face image signals of the user 14 supplied from the image capturing section 31, and supplies the face image data to the registration list managing unit 74.

At STEP S13, the communication device 11 establishes a connection to the communication device 13, i.e., a target device, via the network 15. More specifically, upon receiving information indicating a connection request to the communication device 13 input by an operation of the user 12 with, for example, the communication devices 11 and 13 being brought closer to within a reachable range of radio of a wireless LAN, the input controlling unit 72 requests a data communication controlling unit 78 to establish a connection to the communication device 13 via the network 15. The data communication controlling unit 78 then causes the network I/F 36 to establish the connection to the communication device 13 via the network 15 on the basis of prestored information necessary for the connection to the network 15.

For example, the communication devices 11 and 13 may be connected each other with a cable, such as a USB (universal serial bus) cable.

At STEP S14, the communication device 11 collects information about the device ID of the communication device 13, the encryption method, and the encryption key from the communication target device 13. More specifically, the data reception controller 94 causes the network I/F 36 to receive the device ID, the encryption method information, and the encryption key, which are the information to be contained in an item, transmitted from the communication device 13 via the network 15. The data reception controller 94 then supplies the received device ID, encryption method information, and encryption key to the registration list managing unit 74. A user ID is information allowing identification of the user 14. The input controlling unit 72 acquires information indicating the user ID input by an operation of the user 12 from the input section 33, and supplies the user ID identifying the user 14 to the registration list managing unit 74.

The device ID, the encryption method information, and the encryption key are not necessarily received by the network I/F 36 and supplied to the registration list managing unit 74. The device ID, the encryption method information, and the encryption key may be, for example, stored in the removable medium 38, and read out from the removable medium 38, and then supplied to the registration list managing unit 74. Types of the removable medium 38 include a memory card.

Furthermore, the user ID is not necessarily acquired from the input section 33 after the user 12 inputs the information indicating the user ID specifying the user 14. The user ID may be sent from the communication device 13 via the network 15, or may be stored in the removable medium 38 such as a memory card, read out from the removable medium 38, and supplied to the registration list managing unit 74.

At STEP S15, the registration list managing unit 74 gathers the face image data of the user 14 supplied from the image capturing controlling unit 71, the user ID specifying the user 14 supplied from the input controlling unit 72, and the device ID specifying the communication device 13, the encryption method information, and the encryption key supplied from the data communication controlling unit 78 in one item, and registers the item in a registration list 51. The registration list managing unit 74 then stores the registration list 51 having the item of the user face image, the user ID, the device ID, the encryption method information, and the encryption key in a storage section 32, and the item registration operation is finished.

As described above, the communication device 11 can prestore the registration list 51 in the storage section 32.

Figure 5:
FIG. 5 is a diagram illustrating an example registration list.
Figure 5:
Figure 5:

Each item is registered in the registration list 51 and sorted in terms of the user's face image, the user ID, and the device ID. As shown in FIG. 5, for example, in a case where one user (e.g., Taro) owns a plurality of devices (e.g., Taro's digital camera and a digital camera of the Morimura family) for example, a plurality of items including the same user ID and the same user's face image and the different device IDs are registered in the registration list 51. On the other hand, in a case where a plurality of users (e.g., Taro and Hanako) use one device (e.g., Taro's digital camera), a plurality of items having different user IDs and user's face images and the same device ID are registered in the registration list 51.

The user ID may be an ID, such as, for example, an email address used by the user 14 and an alias of the email address, which uniquely identifies each user. The device ID may be an ID uniquely identifying each device. The ID may be, for example, an ID made from "device manufacturer name+ model number+serial number", a MAC (media access control) address of a wireless LAN interface, or information identifying the "manufacturer name", the "model number", and the "serial number" written as a URL (uniform resource locator).

For example, as shown in FIG. 5, the user ID "taro@aaaa.jp" identifying the user, i.e., Taro, the user's (Taro's) face image, and the device ID [00:01:02:03:04:05] identifying Taro's digital camera are gathered in one item, and the item is registered in the registration list 51.

In addition, the user ID "hanako@bbbb.jp" identifying the user, i.e., Hanako, the user's (Hanako's) face image, and the device ID [00:01:02:03:04:05] identifying Taro's digital camera are gathered in one item, and the item is registered in the registration list 51.

Furthermore, the user ID "taro@aaaa.jp" identifying the user, i.e., Taro, the user's (Taro's) face image, and the device ID [00:01:02:06:07:08] identifying the digital camera of the Morimura family are gathered in one item, and the item is registered in the registration list 51.

Now, referring to FIG. 6, items registered in the registration list 51 stored in the communication device 11 will be described more in detail.

Figure 6:
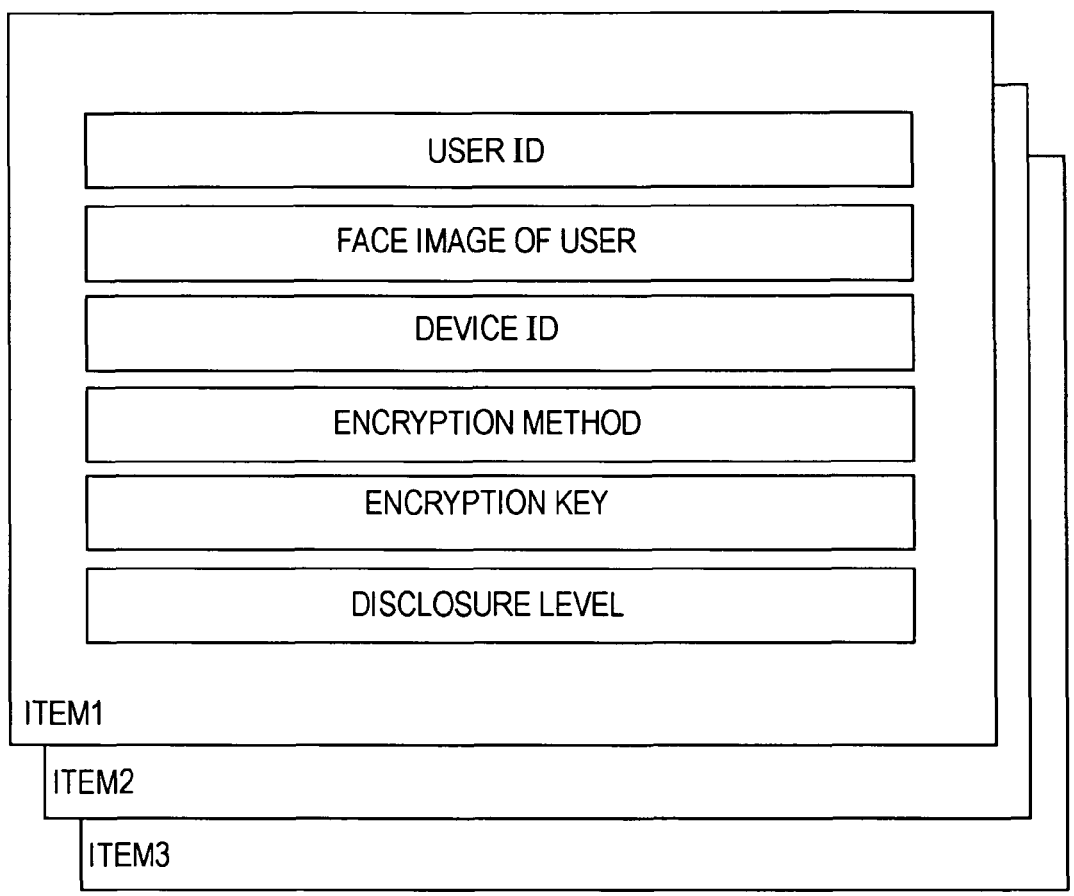
FIG. 6 is a diagram illustrating an example structure of a registration list.

The registration list 51 shown in FIG. 6 includes a plurality of items (i.e., items 1 to 3). Each item has information specifying the communication device 13 and the user 14 and information used for controlling the communication with the specified communication device 13 and user 14. More specifically, each of the items registered in the registration list 51 has information about, for example, the user ID, the user's face image, the device ID, the encryption method, the encryption key, and the disclosure level.

The user's face image is obtained by capturing the face image of the user 14 with the communication device 11. It is desirable that the user's face image is a full-faced face image so that the image is obviously recognizable as a face.

The encryption method and the encryption key are used for authentication of the target device and encrypted communication with the target device. The encryption method information indicates the encryption method used for the authentication of the target device and the communication with the target device. The encryption key is used for encryption and decryption of data according to the encryption method. Kinds of the encryption method include, for example, common key cryptosystems, such as, for example, DES (data encryption standard), AES (advanced encryption standard), and RC4 (Rivest cipher), and public key cryptosystems, such as RSA (R. Rivest, A. Shamir, L. Adelman), Diffie-Hellman, and an elliptic curve cryptosystem. The length of the encryption key may be 64 bits or 1024 bits.

The disclosure level indicates an authorized data access range permitted for the target device. More specifically, the disclosure level may be represented by, for example, natural numbers 1 to 10. If the disclosure level is set to 10, the communication target is authorized to access all of the data 52. In addition, for example, information specifying accessible directories and files may be directly written in the disclosure level. The disclosure level is input by the user 12, and acquired by the input controlling unit 72 from the input section 33, and supplied to the registration list managing unit 74.

Referring next to a flowchart shown in FIG. 7, an operation of initiating communication with the communication device 13 performed by the communication device 11 shown in FIG. 3 will be described. It is assumed that the connection between the communication devices 11 and 13 has been authenticated before starting the communication initiating operation.

The communication device 11 starts the operation, for example, upon the input controlling unit 72 receiving an instruction for selecting the operational mode after the user operates the input section 33.

An instruction for selecting a "select item from list/connect mode" indicates an operation performed in order to set the operational mode to the "select item from list/connect mode". At STEP S31, the input controlling unit 72 receives the instruction for selecting the "select item from list/connect mode" supplied from the input section 33. The input control unit 72 instructs the mode setter (not shown) to switch the operational mode to the "select item from list/connect mode". In response to the instruction given by the input controlling unit 72, the mode setter switches the operational mode to the "select item from list/connect mode". For example, the mode setter sets a flag for the "select item from list/connect mode" so as to switch the operational mode to the "select item from list/connect mode".

At STEP S32, the registration list managing unit 74 reads out the registration list 51 from the storage section 32. The registration list managing unit 74 supplies the read out registration list 51 to the display controlling unit 73. The display controlling unit 73 generates display data used for displaying the registration list 51 read out by the registration list managing unit 74, and supplies the display data to the monitor 34.

The monitor 34 displays the registration list 51 on the basis of the display data supplied from the display control unit 73.

At STEP S33, the input controlling unit 72 receives the information indicating one item selected with an operation performed by the user 12 from the items registered in the registration list 51 displayed on the monitor 34 from the input section 33. The input controlling unit 72 supplies the information indicating the item selected by the user 12 to the identification unit 75.

Figure 8:
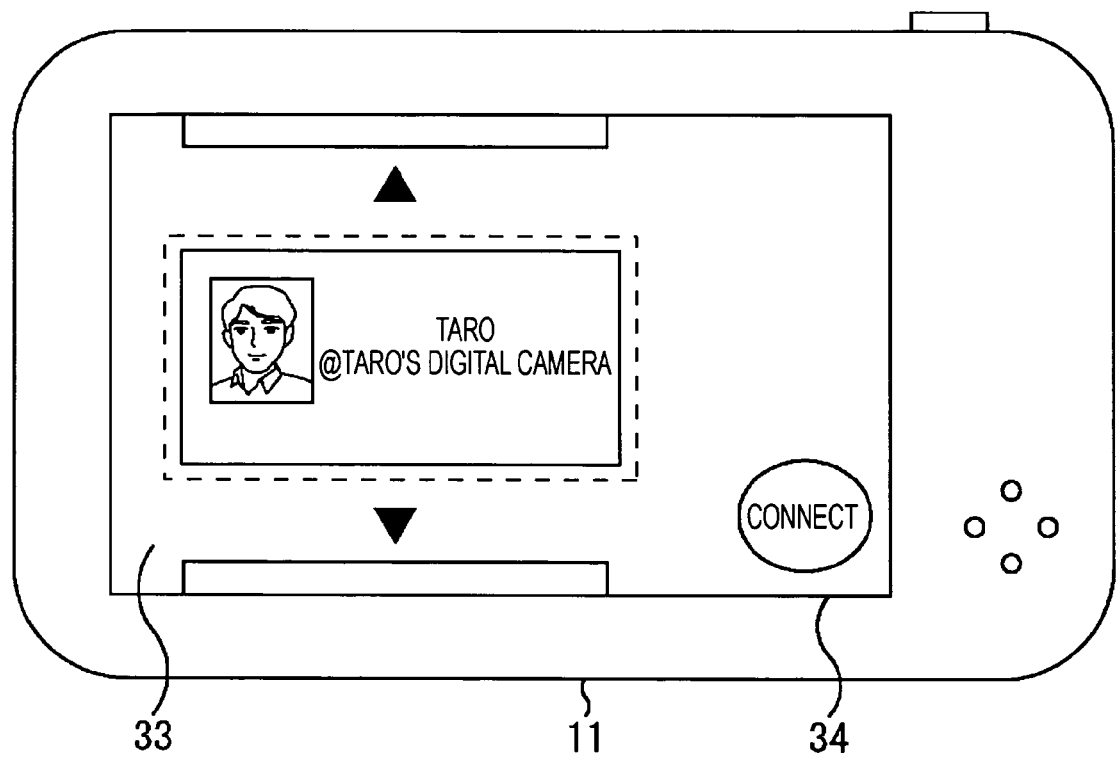
FIG. 8 is a diagram illustrating an example of a registration list displayed on a monitor.

Now, an example display of the registration list 51 displayed on the monitor 34 of the display device 11 is shown in FIG. 8. For example, the registration list 51 is displayed on an item-by-item basis. In each item, the user's face image, and the user ID and the device ID combined using "@" are displayed. The input section 33, i.e., a touch panel, is provided on the monitor 34. For example, a user can select one item by pressing an area of the input section 33 displaying the user's face image, the user ID, and the device ID.

At STEP S34, the ID specifier 93 of the identification unit 75 selects the item selected by the user 12 from the registration list 51 read out by the registration list managing unit 74 on the basis of the information indicating the item selected by the user supplied from the input controlling unit 72. The ID specifier 93 specifies the user ID and the device ID contained in the selected item, and supplies the user ID and the device ID to the read controlling unit 79. In addition, the ID specifier 93 supplies the encryption method information and the encryption key included in the item containing the specified user ID and device ID to the authentication processing unit 76.

At STEP S35, the authentication processing unit 76 communicates with the communication device 13 via the encryption processing unit 77, the data communication controlling unit 78, the network I/F 36, and the network 15 so as to authenticate the communication device 13. At this time, the authentication is performed using the information of the encryption method and the encryption key, contained in the item selected by the user 12, supplied from the ID specifier 93 of the identification unit 75.

At STEP S36, the authentication processing unit 76 determines whether or not the communication device 13 is valid. If the authentication processing unit 76 determines that the communication device 13 is valid, the authentication processing unit 76 supplies the authentication result to the read controlling unit 79, and the process proceeds to STEP S37.

At STEP S37, the read controlling unit 79 permits reading and transmission of data on the basis of the authentication result supplied from the authentication processing unit 76. The read controlling unit 79 reads out the disclosure level contained in the corresponding item of the registration list 51 read out by the registration list managing unit 74 on the basis of the user ID and the device ID supplied from the identification unit 75. The read controlling unit 79 reads out the data 52 from the storage section 32 according to the read out disclosure level, and supplies the data 52 to the encryption processing unit 77.

At STEP S38, the encryption processing unit 77 encrypts the data 52 supplied from the read controlling unit 79, and supplies the encrypted data to the data communication controlling unit 78. The data transmission controller 95 of the data communication controlling unit 78 supplies the encrypted data, supplied from the encryption processing unit 77, to the network I/F 36. The network I/F 36 transmits the encrypted data to the communication device 13 via the network 15 under the control of the data transmission controller 95, and the operation is finished.

On the other hand, if the communication device 13 is determined to be invalid at STEP S36, the process proceeds to STEP S39. At STEP S39, the authentication processing unit 76 supplies the authentication result to an error processing unit (not shown). The error processing unit generates information indicating the invalid communication target on the basis of the authentication result supplied from the authentication processing unit 76, and supplies the information to the display controlling unit 73. The display controlling unit 73 generates display data used for displaying an error message indicating the invalid communication target on the basis of the supplied information, and supplies the display data to the monitor 34. The monitor 34 displays the error message indicating the invalid communication target on the basis of the display data supplied from the display controlling unit 73, and the process is finished.

As described above, the communication device 11 can start the communication by identifying and authenticating the target device using the displayed registration list 51.

Referring next to a flowchart of FIG. 9, an operation of initiating other types of communication with the communication device 13 performed by the communication device 11 shown in FIG. 3 will be described. It is assumed that the connection between the communication devices 11 and 13 has been authenticated before starting the communication initiating operation.

The communication device 11 starts the communication initiating operation, for example, upon the input controlling unit 72 receiving an instruction for selecting the operational mode after the user operates the input section 33.

An instruction for selecting a "capture image with camera/connect mode" indicates an operation performed in order to set the operational mode to the "capture image with camera/connect mode". At STEP S51, the input controlling unit 72 receives the instruction for selecting the "capture image with camera/connect mode" supplied from the input section 33. The input control unit 72 instructs the mode setter (not shown) to switch the operational mode to the "capture image with camera/connect mode". In response to the instruction given by the input controlling unit 72, the mode setter switches the operational mode to the "capture image with camera/connect mode". For example, the mode setter sets a flag for the "capture image with camera/connect mode" so as to switch the operational mode to the "capture image with camera/connect mode"

At STEP S52, the image capturing section 31 captures a face image of the target user 14 under the control of the image capturing controlling unit 71. The image capturing controlling unit 71 generates image data from image signals supplied from the image capturing section 31, and supplies the image data to the identification unit 75.

The image captured at this time may be a still image or a movie.

At STEP S53, the face image recognizer 91 of the identification unit 75 discriminates a part corresponding to a face from the image data, supplied from the image capturing controlling unit 71, of the image obtained by capturing the image of the face of the user 14, and recognizes the part as the face image.

More specifically, for example, the face image recognizer 91 selects a part including at least a predetermined number of neighboring pixels having values corresponding to a color of skin as a candidate of the face image.

The face image recognizer 91 then compares the candidate face image with a template representing an average face image, and determines that the candidate face image matching the template as the face image.

At STEP S54, the registration list managing unit 74 reads out the registration list 51 from the storage section 32. A face image determiner 92 extracts the face images from the items registered in the registration list 51 read out by the registration list managing unit 74. More specifically, the face image determiner 92 extracts the face image data from the items in the registration list 51.

At STEP S55, the face image determiner 92 compares the captured face image recognized by the face image recognizer 91 with the face images contained in the read out items, i.e., the face images indicated by the face image data contained in the items registered in the registration list 51 so as to determine whether or not the face images match.

At this time, the face image determiner 92 may, for example, rotate the captured face image by a predetermined number of degrees, and calculate a center line of the face of the face image and a likelihood of the center line being the actual center line of the face from the rotated face image on the basis of the symmetry property of the face, and tilt the rotated face image at the angle of the center line having the highest likelihood. The face image determiner 92 can determine whether or not the face images match by comparing the tilt-corrected face image with the face images indicated by the face image data contained in the items.

At STEP S56, if the captured face image recognized by the face image recognizer 91 matches the face image contained in the item registered in the registration list 51 read out by the registration list managing unit 74, the process proceeds to STEP S57. At STEP S57, the face image determiner 92 supplies information specifying the item containing the face image determined to match the captured face image to the ID specifier 93. The ID specifier 93 specifies the item from the registration list 51 read out by the registration list managing unit 74 on the basis of the information specifying the item supplied from the face image determiner 92. That is, the ID specifier 93 specifies the item containing the face image of the user matching the captured face image of the user. In addition, the ID specifier 93 specifies the device ID and the user ID stored in association with the matching face image of the user.

At STEP S58, the identification unit 75 determines whether or not a plurality of items containing the user ID specified at STEP S57 are registered in the registration list 51. If the identification unit 75 determines that the plurality of items containing the specified user ID are registered in the registration list 51, the process proceeds to STEP S59. At STEP S59, the ID specifier 93 specifies the user IDs and the device IDs contained in the plurality of specified items, and supplies the user IDs and the device IDs to the registration list managing unit 74. The registration list managing unit 74 generates a candidate list constituted by the items, containing the specified user ID, extracted from the registration list 51 read out from the storage section 32 on the basis of the specified user IDs and device IDs supplied from the ID specifier 93 of the identification unit 75. The registration list managing unit 74 then supplies the candidate list to the display controlling unit 73. The display controlling unit 73 generates display data used for displaying the candidate list generated by the registration list managing unit 74, and supplies the display data to the monitor 34. The monitor 34 displays the candidate list on the basis of the display data used for displaying the candidate list.

At STEP S60, the input controlling unit 72 receives the information indicating one item selected with an operation performed by the user 12 from the items included in the candidate list displayed on the monitor 34 from the input section 33. The input controlling unit 72 then supplies the information indicating the item selected by the user 12 to the identification unit 75.

For example, the display controlling unit 73 causes the monitor 34 to display the candidate list on an item-by-item basis at STEP S59. For each item, the user's face image, and the user ID and the device ID combined with "@" are displayed. At STEP S60, for example, a user can select one item by pressing an area of the input section 33, i.e., a touch panel, provided on the monitor 34, displaying the user's face image, the user ID, and the device ID.

At STEP S61, the ID specifier 93 of the identification unit 75 selects the item from the registration list 51 read out by the registration list managing unit 74 on the basis of the information indicating the item selected by the user supplied from the input controlling unit 72. The ID specifier 93 specifies the user ID and the device ID contained in the selected item, and supplies the user ID and the device ID to the read controlling unit 79. In addition, the ID specifier 93 supplies the encryption method information and the encryption key included in the item containing the specified user ID and device ID to the authentication processing unit 76.

On the other hand, if the identification unit 75 determines that only one item containing the user ID specified at STEP S57 is registered in the registration list at STEP S58, the ID specifier 93 specifies the user ID and the device ID contained in the specified item, and supplies the user ID and the device ID to the read controlling unit 79. In addition, the ID specifier 93 supplies the encryption method information and the encryption key contained in the specified item to the authentication processing unit 76, and the process proceeds to STEP S62.

At STEP S62, the authentication processing unit 76 communicates with the communication device 13 via the encryption processing unit 77, the data communication controlling unit 78, the network I/F 36, and the network 15 so as to authenticate the communication device 13. At this time, the authentication is performed using the encryption method and the encryption key contained in the item selected at STEP S60 or specified at STEP S57.

Figure 7:
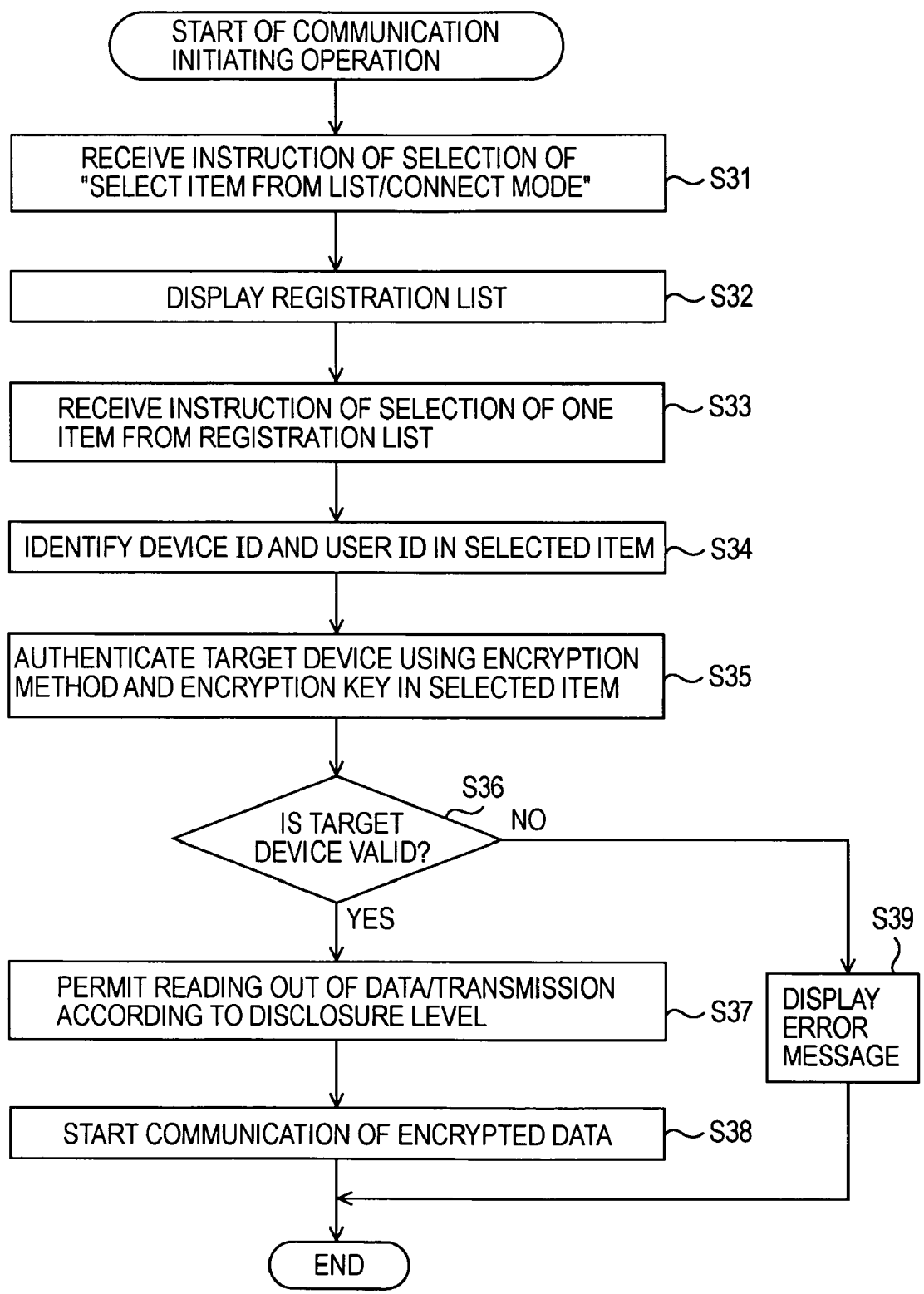
FIG. 7 is a flowchart illustrating an example of a communication initiating operation.

Since processing performed at STEPs S63 to S66 is the same as that performed at STEPs S36 to S39 in the flowchart shown in FIG. 7, description thereof is omitted.

On the other hand, if the captured face image recognized by the face image recognizer 91 does not match any of the face images contained in the items registered in the registration list 51 read out by the registration list managing unit 74, the process proceeds to STEP S66.

As described above, the communication device 11 can identify the user by capturing the image of the target user and comparing the captured face image of the user with the pre-registered face images, and can start the communication by identifying the device corresponding to the face image and authenticating the target user and device.

In the above description, the read controlling unit 79 is configured to control reading of the data 52 according to the disclosure level. However, the operation information indicating the operation to be executed may be contained in the item instead of or together with the disclosure level, and an operation processing unit for executing various operations may be included in the communication device. The operation processing unit may be configured to execute operations, such as image processing, printing, or retrieving, for the communication device 13 according to the operation information. That is, the communication device 11 may provide not only data but also various services to the communication device 13.

In addition, in the above description, the communication device 11 is configured to identify the user 14 and the communication device 13. However, the communication device 13 may be also configured to identify the user 12 and the communication device 11, and both the communication devices 11 and 13 may be configured to identify the target device and user thereof.

As described above, when the communication device is connected to an electronic device via the network, the communication device can communicates with the target device via the network. In addition, the device identification information identifying the electronic device and the face image of the user using the electronic device are stored with being associated with each other. An image of the face of the user is then captured, and the electronic device is identified on the basis of the device identification information stored in association with the face image that matches the captured face image of the user. In such a case, the access control can be performed on a device-by-device basis.

Additionally, the device identification information identifying the electronic device, the face image of the user using the electronic device, and the user identification information identifying the user are stored with being associated with each other. An image of the face of the user is then captured, and whether or not the captured face image of the user matches the stored face image is determined. If the captured face image of the user is determined to match the stored face image, it is possible to perform the access control for each target device and each user using the device as long as the device is configured to identify the device identification information and the user identification information stored in association with the matching face image.

The embodiments of the present invention are applied not only to digital still cameras or digital video cameras but also other devices, such as, for example, mobile phones and mobile personal computers, which can capture images of subjects.

The series of processing described above can be executed by hardware or software. When the series of processing is executed by software, programs constituting the software are installed in a computer built in dedicated hardware or, for example, a general-purpose personal computer or the like, capable of executing various functions by installing various programs, from a recording medium storing the programs.

Types of recording medium storing programs, which is installed in a computer and is executable by the computer, include the removable medium 38, a ROM (not shown) temporarily or permanently storing the programs, and a hard disk constituting the storage section 32 as shown in FIG. 2. The removable medium 38 may be a package medium such as a magnetic disc (including a flexible disc), an optical disc (including a CD-ROM (compact disc-read only memory) and a DVD (digital versatile disc)), a magneto-optical disc, or a semiconductor memory. The programs may be stored in the recording medium via the network I/F 36 using a communication medium with or without a cable if necessary. The network I/F 36 is an interface such as a router and a modem. The communication medium may be the network 15, a local area network, the Internet, or a digital satellite broadcasting.

In this specification, the steps described in a program recorded on a recording medium include processing that is executed sequentially in the described order, and also includes processing that is executed in parallel or individually, not necessarily sequentially.

In addition, the embodiments of the present invention should not be limited to the above described embodiments, and various modifications can be made without departing from the spirit and scope of the present invention.

The invention claimed is:

1. A communication device that communicates with an electronic device via a network, the communication device comprising:
   storage means storing device identification information identifying the electronic device and one or more face images of one or more users that use the electronic device while associating the device identification information with each of the face images of the users of the electronic device;
   image capturing means capturing an image of a face of the user of the electronic device; and
   identification means identifying the electronic device on the basis of the device identification information stored in association with one of the stored face images that matches the captured image of the face of the user of the electronic device,
   the electronic device being a first digital camera usable by the user and the communication device being a second digital camera separate from the first digital camera and usable by a second user who is different from the user of the first digital camera such that during operation the image capturing means of the second digital camera captures the image of the face of the user currently using the first digital camera.

2. The device according to claim 1, wherein the storage means stores user identification information identifying each of the users in association with the corresponding face images of the users, and wherein
   the identification means identifies the user on the basis of the user identification information stored in association with one of the stored face images that matches the captured image of the face of the user.

3. The device according to claim 1, wherein the storage means stores encryption method information, indicating an encryption method, and an encryption key in association with each of the face images of the users, the device further comprising:
   authentication means authenticating the electronic device using the encryption method information and the encryption key stored in association with one of the stored face images that matches the captured image of the face of the user.

4. The device according to claim 1, wherein the storage means stores range information indicating a range of data permitted to be provided to the electronic device used by the user in association with each of the face images of the users, the device further comprising:
   read controlling means controlling reading of data recorded on a recording medium according to the range information stored in association with one of the stored face images that matches the captured image of the face of the user.

5. The device according to claim 1, wherein the storage means stores operation information indicating an operation to be executed in response to a request from the electronic device used by the user in association with each of the face images, the device further comprising:
   operation executing means executing the operation according to the operation information stored in association with one of the stored face images that matches the captured image of the face of the user.

6. The device according to claim 1, further comprising:
   display controlling means controlling displaying of a list of the stored face images; and
   input means receiving an instruction, for selecting one of the displayed face images, corresponding to a user operation performed on the displayed list of the face images, wherein
   the identification means identifies the electronic device on the basis of the device identification information stored in association with the selected face image.

7. The device according to claim 1, further comprising:
   recognizing means recognizing a face image obtained by capturing the image of the face of the user of the electronic device;
   determining means determining whether or not the face image resulting from the capturing matches one of the stored face images;
   display controlling means controlling displaying of a list of the stored face images to be determined to match the face image resulting from the capturing and the associated device identification information; and input means receiving an instruction, for selecting one of the displayed face images and the device identifying information, corresponding to a user operation performed on the displayed list of the face images and the device identifying information, wherein the identification means identifies the electronic device on the basis of the selected device identification information.

8. A communication method for enabling communication between a communication device and an electronic device via a network, the method comprising:

storing device identification information identifying the electronic device and one or more face images of one or more users that use the electronic device while associating the device identification information with each of the face images of the users of the electronic device;

capturing an image of a face of the user of the electronic device; and identifying the electronic device on the basis of the device identification information stored in association with one of the stored face images that matches the captured image of the face of the user of the electronic device, the storing, the capturing, and the identifying being performed by the communication device, and the electronic device being a first digital camera usable by the user and the communication device being a second digital camera separate from the first digital camera and usable by a second user who is different from the user of the first digital camera such that during operation the image capturing performed by the second digital camera captures the image of the face of the user currently using the first digital camera.

9. A program operable to cause a computer to execute a process for controlling a communication device that communicates with an electronic device via a network, the process comprising:

controlling storing of device identification information identifying the electronic device and one or more face images of one or more users that use the electronic device so that the device identification information is associated with each of the face images of the users of the electronic device;

controlling capturing of an image of a face of the user of the electronic device; and identifying the electronic device on the basis of the device identification information stored in association with one of the stored face images that matches the captured image of the face of the user of the electronic device, the electronic device being a first digital camera usable by the user and the communication device being a second digital camera separate from the first digital camera and usable by a second user who is different from the user of the first digital camera such that during operation the controlling capturing of the image by the second digital camera controls the capturing of the image of the face of the user currently using the first digital camera.

10. A communication device operable to communicate with an electronic device via a network, the communication device comprising:

storage means storing device identification information identifying the electronic device, one or more face images of one or more users that use the electronic device, and user identification information identifying each of the users while associating the device identification information, each of the face images, and the user identification information with each other;

image capturing means capturing an image of a face of the user of the electronic device;

determining means determining whether or not the captured face image of the user of the electronic device matches one of the stored face images; and identification means specifying the device identification information and the user identification information stored in association with the matching face image when the captured face image of the user and one of the stored face images are determined to match, the electronic device being a first digital camera usable by the user and the communication device being a second digital camera separate from the first digital camera and usable by a second user who is different from the user of the first digital camera such that during operation the image capturing means of the second digital camera captures the image of the face of the user currently using the first digital camera.

11. A communication method enabling communication between a communication device and an electronic device via a network, the method comprising:

storing device identification information identifying the electronic device, one or more face images of one or more users that use the electronic device, and user identification information identifying each of the users while associating the device identification information, each of the face images, and the user identification information with each other;

capturing an image of a face of the user of the electronic device;

determining whether or not the captured face image of the user of the electronic device matches one of the stored face images; and specifying the device identification information and the user identification information stored in association with the matching face image when the captured face image of the user and one of the stored face images are determined to match, the storing, the capturing, the determining, and the specifying being performed by the communication device, and the electronic device being a first digital camera usable by the user and the communication device being a second digital camera separate from the first digital camera and usable by a second user who is different from the user of the first digital camera such that during operation the image capturing performed by the second digital camera captures the image of the face of the user currently using the first digital camera.

12. A program operable to cause a computer to execute a process for controlling a communication device that communicates with an electronic device via a network, the process comprising:

controlling storing of device identification information identifying the electronic device, one or more face images of one or more users that use the electronic device, and user identification information identifying each of the users while so that the device identification information, each of the face images, and the user identification information are associated with each other;

controlling capturing of an image of a face of the user of the electronic device;

determining whether or not the captured face image of the user of the electronic device matches one of the stored face images; and specifying the device identification information and the user identification information stored in association with the matching face image when the captured face image of the user and one of the stored face images are determined to match, the electronic device being a first digital camera usable by the user and the communication device being a second digital camera separate from the first digital camera and usable by a second user who is different from the user of the first digital camera such that during operation the controlling capturing of the image by the second digital camera controls the capturing of the image of the face of the user currently using the first digital camera.

13. A recording medium storing program operable to cause a computer to execute a process for controlling a communication device that communicates with an electronic device via a network, the process comprising:

controlling storing of device identification information identifying the electronic device and one or more face images of one or more users that use the electronic device so that the device identification information is associated with each of the face images of the users of the electronic device;

controlling capturing of an image of a face of the user of the electronic device; and identifying the electronic device on the basis of the device identification information stored in association with one of the stored face images that matches the captured image of the face of the user of the electronic device, the electronic device being a first digital camera usable by the user and the communication device being a second digital camera separate from the first digital camera and usable by a second user who is different from the user of the first digital camera such that during operation the controlling capturing of the image by the second digital camera controls the capturing of the image of the face of the user currently using the first digital camera.

14. A recording medium storing a program operable to cause a computer to execute a process for controlling a communication device that communicates with an electronic device via a network, the process comprising:

controlling storing of device identification information identifying the electronic device, one or more face images of one or more users that use the electronic device, and user identification information identifying each of the users while so that the device identification information, each of the face images, and the user identification information are associated with each other;

controlling capturing of an image of a face of the user of the electronic device;

determining whether or not the captured face image of the user of the electronic device matches one of the stored face images; and specifying the device identification information and the user identification information stored in association with the matching face image when the captured face image of the user and one of the stored face images are determined to match, the electronic device being a first digital camera usable by the user and the communication device being a second digital camera separate from the first digital camera and usable by a second user who is different from the user of the first digital camera such that during operation the controlling capturing of the image by the second digital camera controls the capturing of the image of the face of the user currently using the first digital camera.

15. A communication device operable to communicate with an electronic device via a network, the communication device comprising:

a storage section for storing device identification information identifying the electronic device and one or more face images of one or more users that use the electronic device while associating the device identification information with each of the face images of the users;

an image capturing section for capturing an image of a face of the user of the electronic device; and an identification section for identifying the electronic device on the basis of the device identification information stored in association with one of the stored face images that matches the captured image of the face of the user of the electronic device, the electronic device being a first digital camera usable by the user and the communication device being a second digital camera separate from the first digital camera and usable by a second user who is different from the user of the first digital camera such that during operation the image capturing section of the second digital camera captures the image of the face of the user currently using the first digital camera.

16. A communication device operable to communicate with an electronic device via a network, the communication device comprising:

a storage section for storing device identification information identifying the electronic device, one or more face images of one or more users that use the electronic device, and user identification information identifying each of the users while associating the device identification information, each of the face images, and the user identification information with each other;

an image capturing section for capturing an image of a face of the user of the electronic device;

a determining section for determining whether or not the captured face image of the user of the electronic device matches one of the stored face images; and an identification section for specifying the device identification information and the user identification information stored in association with the matching face image when the captured face image of the user and one of the stored face images are determined to match, the electronic device being a first digital camera usable by the user and the communication device being a second digital camera separate from the first digital camera and usable by a second user who is different from the user of the first digital camera such that during operation the image capturing section of the second digital camera captures the image of the face of the user currently using the first digital camera.

* * * * *

UNITED STATES PATENT AND TRADEMARK OFFICE
CERTIFICATE OF CORRECTION

PATENT NO. : 7,861,089 B2  Page 1 of 1
APPLICATION NO. : 11/652390
DATED : December 28, 2010
INVENTOR(S) : Nobuyoshi Tomita It is certified that error appears in the above-identified patent and that said Letters Patent is hereby corrected as shown below:

On the Title Page of the patent, please add Item (30) --Foreign Application Priority Data Japan P2006-006308 1/13/2006--.

Signed and Sealed this
Eighth Day of March, 2011

David J. Kappos
*Director of the United States Patent and Trademark Office*